Patented Nov. 9, 1943

2,333,796

UNITED STATES PATENT OFFICE 2,333,796

POLYVINYL ACETAL RESIN AND FILM THEREFROM

William O. Kenyon and Wendell H. McDowell, Rochester, N. Y., assignors to Eastman Kodak Company, Rochester, N. Y., a corporation of New Jersey No Drawing. Application June 13, 1940, Serial No. 340,368

6 Claims. (Cl. 260—73)

This invention relates to resins and more particularly to polyvinyl acetyl resins, and to film made of such resins.

A number of polyvinyl acetal resins are known. These known resins are characterized by containing, attached to the polyvinyl chain, acetal groups and hydroxyl groups. Sometimes, the resins also contain ester groups attached to the polyvinyl chain.

Polyvinyl resins can be prepared by condensing a polyvinyl alcohol with one or more aldehydes, in the presence of an acetal condensation catalyst. Prepared in this way, polyvinyl acetal resins always contain acetal groups and hydroxyl groups. Polyvinyl acetal resins can also be prepared by deesterifying a polyvinyl ester and concomitantly condensing one or more aldehydes with the deesterified product, or similarly, polyvinyl acetal resins can be prepared by partially deesterifying a polyvinyl ester and subsequently condensing one or more aldehydes with the deesterified product. Prepared in either of the latter two ways, the polyvinyl acetal resins contain acetal, hydroxyl and ester groups.

Among the known polyvinyl acetal resins, the polyvinyl acetaldehyde acetal resins (containing an acetate group content equivalent to not more than about five percent by weight of polyvinyl acetate) have appeared to be the most interesting of the polyvinyl acetal resins in which the acetal linkages are formed from but a single aldehyde. These polyvinyl acetaldehyde acetal resins appeared to be useful for a variety of purposes in the plastics field. For example, such resins can be cast from ordinary simple solutions into the form of film or sheet. However, the film or sheet is too brittle to be adapted commercially to certain uses; for instance, the film or sheet is too brittle to serve as a support for light-sensitive photographic coatings in the manufacture of cinematographic film. Efforts to decrease the brittleness of such resins by changing the chemical composition thereof, viz. by increasing the hydroxyl group content, have resulted in resins which are too water-susceptible to be employed commercially in the manufacture of cinematographic film.

We have now found that the hydroxyl groups in polyvinyl acetal resins in general, and in particular in polyvinyl acetaldehyde acetal resins, can be substantially completely replaced by ester groups. When the hydroxyl groups of a polyvinyl acetaldehyde acetal resin (containing an acetate group content equivalent to not more than 5 per cent by weight of polyvinyl acetate) are replaced by propionate or butyrate groups, a resin is obtained from which film or sheet of very good flexibility and low water susceptibility can be made.

It is, accordingly, an object of our invention to provide new resins. A further object is to provide a process for preparing such resins. A still further object is to provide film or sheet of such resins. Other objects will become apparent hereinafter.

According to a preferred embodiment of our invention, we substantially completely replace the hydroxyl groups of polyvinyl acetal resins by esterifying the hydroxyl groups with anhydrides of monobasic carboxylic acids, in the presence of a sufficient quantity of pyridine to dissolve the starting polyvinyl acetal resin. Heat accelerates the esterification. The following examples will serve to illustrate the manner of preparing our new resins. These examples are not intended to limit our invention.

Example 1

100 g. of a polyvinyl acetaldehyde acetal resin (containing a hydroxyl group content equivalent to about 6.5% by weight of polyvinyl alcohol and an acetate group content equivalent to about 3.3% by weight of polyvinyl acetate) were dissolved in 1000 cc. of pyridine. 500 cc. of propionic anhydride were added to the resulting solution and the mixture was heated, under reflux, at 100° C. for about 2½ hours. The mixture was cooled and diluted with 1000 cc. of acetone. The diluted solution was poured into water to precipitate the resin. The precipitated resin was dissolved in acetone and reprecipitated in water. The resin was then allowed to dry in the air. An analysis showed the resin to contain an acetate group content equivalent to about 3.1% by weight of polyvinyl acetate, a propionate group content equivalent to about 13.7% by weight of polyvinyl propionate and substantially no hydroxyl group content.

Example 2

100 g. of the same kind of polyvinyl acetaldehyde acetal resin which was employed in Example 1 were dissolved in 1000 cc. of pyridine. 500 cc. of butyric anhydride were added to the resulting solution and the mixture was heated, under reflux, at 100° C. for about 2½ hours. The mixture was then diluted with 100 cc. of acetone. The diluted solution was poured into water to precipitate the resin. The precipitated resin was dissolved in acetone and reprecipitated in water. The resin was then allowed to dry in the air.

An analysis showed the resin to contain substantially no hydroxyl group content.

In a similar manner the hydroxyl groups of polyvinyl formaldehyde acetal resins, polyvinyl propionaldehyde acetal resins, polyvinyl chloroacetaldehyde acetal resins, polyvinyl acetaldehyde-benzaldehyde acetal resins and polyvinyl benzaldehyde acetal resins can be substantially completely replaced by ester groups to give resins of improved flexibility and lower water susceptibility.

To prepare film or sheet from our new resins, we first dissolve about 1 part of the resin in from 2½ to 4½ parts of a suitable solvent, such as acetone or a mixture of 90% (by volume) of acetone and 10% methyl alcohol or ethylene dichloride for example. If necessary to obtain a clear solution, larger quantities of solvent may be employed. Such a solution is then cast onto a film-forming surface, such as a metal or glass plate, or a revolving drum, to desired thickness and the resulting film or sheet is allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of low water susceptibility and good flexibility. The resulting film or sheet can be coated directly with photographic emulsion (e. g. photographic gelatino-silver-halide emulsions) or can be coated first with resinous or other known "subbing" materials before the photographic emulsion is applied.

The following table shows the flexibility and moisture susceptibility of a representative one of our new resins as compared with a similar resin containing an appreciable hydroxyl group content.

| Resin | Hydroxyl | Moisture susceptibility (swell and shrink amplitude) | Flexibility (number of folds before break) |
|---|---|---|---|
| Polyvinyl acetaldehyde acetal | 6.5 | 21 | 28 |
| Propionated polyvinyl acetaldehyde acetal | 0 | 13 | 35 |

From the foregoing comparative data, it is apparent that our new resins have a lower moisture susceptibility and a greater flexibility than the resins containing an appreciable hydroxyl group content.

Our new resins can be pressed into blocks and skived to thin sheets or layers which can be used as a laminating material, e. g. between sheets of glass, particularly if suitably plasticized. Our new resins are compatible with a number of plasticizers, such as tributylphosphate, triphenylphosphate, tricresylphosphate, diamylphosphate, dibutylphosphate, di- and triglycerol esters, such as acetates, propionates, butyrates and the like, mono- chloronaphthalene and the like.

Our new resins can be successfully molded or extruded when suitably plasticized.

What we claim as our invention and desire to be secured by Letters Patent of the United States is:

1. A process for preparing a polyvinyl acetaldehyde acetal resin substantially free from hydroxyl groups comprising substantially completely esterifying with ester groups selected from the group consisting of propionate and butyrate groups the hydroxyl groups in a polyvinyl acetaldehyde acetal resin containing no acetal groups other than acetaldehyde acetal groups, a hydroxyl group content equivalent to about 6.5 per cent by weight of polyvinyl alcohol and an acetate group content equivalent to about 3.3 per cent by weight of polyvinyl acetate.

2. A process for preparing a polyvinyl acetaldehyde acetal resin substantially free from hydroxyl groups comprising substantially completely esterifying with propionate groups the hydroxyl groups in a polyvinyl acetaldehyde acetal resin containing no acetal groups other than acetaldehyde acetal groups, a hydroxyl group content equivalent to about 6.5 per cent by weight of polyvinyl alcohol and an acetate group content equivalent to about 3.3 per cent by weight of polyvinyl acetate.

3. A process for preparing a polyvinyl acetaldehyde acetal resin substantially free from hydroxyl groups comprising substantially completely esterifying with butyrate groups the hydroxyl groups in a polyvinyl acetaldehyde acetal resin containing no acetal groups other than acetaldehyde acetal groups, a hydroxyl group content equivalent to about 6.5 per cent by weight of polyvinyl alcohol and an acetate group content equivalent to about 3.3 per cent by weight of polyvinyl acetate.

4. The polyvinyl acetal resin obtained by the process of claim 1.

5. The polyvinyl acetal resin obtained by the process of claim 2.

6. The polyvinyl acetal resin obtained by the process of claim 3.

WILLIAM O. KENYON.
WENDELL H. McDOWELL.